(12) United States Patent
Mogami et al.

(10) Patent No.: US 12,315,182 B2
(45) Date of Patent: May 27, 2025

(54) APPARATUS AND A METHOD FOR ESTIMATING DEPTH OF A SCENE

(71) Applicant: Rapyuta Robotics Co., Ltd., Tokyo (JP)

(72) Inventors: Kota Mogami, Tokyo (JP); Kunal Tyagi, Tokyo (JP)

(73) Assignee: Rapyuta Robotics Co., Ltd., Tokyo (JP)

( * ) Notice: Subject to any disclaimer, the term of this patent is extended or adjusted under 35 U.S.C. 154(b) by 336 days.

(21) Appl. No.: 18/051,884

(22) Filed: Nov. 2, 2022

(65) Prior Publication Data

US 2023/0245333 A1 Aug. 3, 2023

Related U.S. Application Data

(60) Provisional application No. 63/305,698, filed on Feb. 2, 2022.

(51) Int. Cl.
*G06T 7/593* (2017.01)
*G01B 11/22* (2006.01)
(Continued)

(52) U.S. Cl.
CPC .............. *G06T 7/593* (2017.01); *G01B 11/22* (2013.01); *G01S 7/4865* (2013.01); *G01S 17/86* (2020.01);
(Continued)

(58) Field of Classification Search
CPC ....... G06T 7/593; G06T 7/0002; G06T 7/521; G06T 2207/10012; G06T 2207/10028;
(Continued)

(56) References Cited

U.S. PATENT DOCUMENTS 8,768,044 B2 * 7/2014 Hong ...................... G06T 7/593
382/254
10,089,740 B2 * 10/2018 Srikanth .............. H04N 23/633
(Continued)

FOREIGN PATENT DOCUMENTS

EP 2743861 A2 * 6/2014 ......... G06K 9/00208
WO WO-2021086796 A1 * 5/2021 ........... G05D 1/0088
(Continued)

*Primary Examiner* — Mahendra R Patel
(74) *Attorney, Agent, or Firm* — Trupti P. Joshi (57) ABSTRACT

The present disclosure relates to apparatus (100) for estimating depth of scene, comprising plurality of sensors (101) including Time of Flight (ToF) sensors and stereo sensors pairs, memory (103) and one or more processors (104). At least one pair of stereo sensors is placed perpendicular to other pairs of stereo sensors. One or more processors (104) are configured to determine disparity for plurality of sensors (101) based on comparison between one or more features of each image with other images received from plurality of pairs of stereo sensors, and evaluation of each image based on one or more pre-defined cost function parameters; determine disparity based on depth information received from ToF sensors; determine confidence value for each of plurality of sensors (101), based on disparity, to generate plurality of confidence values and estimate depth of scene based on disparity associated with a sensor selected based on plurality of confidence values.

20 Claims, 6 Drawing Sheets

(51) Int. Cl.
  *G01S 7/4865* (2020.01)
  *G01S 17/86* (2020.01)
  *G01S 17/894* (2020.01)
  *G06T 7/00* (2017.01)
  *G06T 7/521* (2017.01)
  *H04N 13/239* (2018.01)

(52) U.S. Cl.
  CPC .......... *G01S 17/894* (2020.01); *G06T 7/0002* (2013.01); *G06T 7/521* (2017.01); *G06T 2207/10012* (2013.01); *G06T 2207/10028* (2013.01); *G06T 2207/30168* (2013.01); *H04N 13/239* (2018.05)

(58) Field of Classification Search
  CPC . G06T 2207/30168; G06T 2207/20076; G06T 2207/20221; G06T 2207/30164; G01B 11/22; G01S 7/4865; G01S 17/86; G01S 17/894; G01S 17/87; H04N 13/239; H04N 13/128; H04N 13/271; H04N 2013/0081
  USPC .......................................................... 382/106
  See application file for complete search history.

(56) References Cited

U.S. PATENT DOCUMENTS

| | | | | |
|---|---|---|---|---|
| 10,462,446 | B2 * | 10/2019 | Varekamp | H04N 13/302 |
| 10,540,818 | B2 * | 1/2020 | Akeley | G06T 19/006 |
| 10,965,929 | B1 * | 3/2021 | Bellows | H04N 13/122 |
| 10,972,715 | B1 * | 4/2021 | Hall | G06V 10/145 |
| 11,589,031 | B2 * | 2/2023 | Khamis | H04N 5/33 |
| 11,688,073 | B2 * | 6/2023 | Peri | G06T 7/13 |
| | | | | 345/419 |
| 11,763,433 | B2 * | 9/2023 | Liu | G06T 5/60 |
| | | | | 382/100 |
| 11,816,855 | B2 * | 11/2023 | Luo | G06T 7/593 |
| 11,908,100 | B2 * | 2/2024 | Liu | G06T 7/55 |
| 11,948,320 | B2 * | 4/2024 | Sinha | H04N 13/282 |
| 2013/0113881 | A1 * | 5/2013 | Barnum | H04N 13/122 |
| | | | | 348/43 |
| 2013/0129194 | A1 * | 5/2013 | Gusis | G06T 5/50 |
| | | | | 382/154 |
| 2013/0222550 | A1 * | 8/2013 | Choi | G01S 17/894 |
| | | | | 348/47 |
| 2013/0329015 | A1 * | 12/2013 | Pulli | G06T 7/593 |
| | | | | 348/47 |
| 2015/0138346 | A1 * | 5/2015 | Venkataraman | G01B 11/2545 |
| | | | | 348/135 |
| 2015/0178936 | A1 * | 6/2015 | Boisson | G06T 7/593 |
| | | | | 382/154 |
| 2018/0139431 | A1 * | 5/2018 | Simek | H04N 13/271 |
| 2018/0262744 | A1 * | 9/2018 | Tadi | H04N 13/167 |
| 2019/0306489 | A1 * | 10/2019 | Cheng | G06V 10/75 |
| 2020/0160546 | A1 * | 5/2020 | Gu | G06T 3/18 |
| 2020/0162719 | A1 * | 5/2020 | Tadi | H04N 13/271 |
| 2020/0302627 | A1 * | 9/2020 | Duggal | G06N 20/00 |
| 2021/0366142 | A1 * | 11/2021 | Grossinger | H04N 13/254 |
| 2022/0028102 | A1 * | 1/2022 | Chhabria | H04N 13/344 |
| 2022/0111839 | A1 * | 4/2022 | Jiang | G06T 7/593 |
| 2022/0130062 | A1 * | 4/2022 | Bhutani | G06N 3/08 |
| 2022/0383530 | A1 * | 12/2022 | Giryes | G03B 35/08 |
| 2023/0035671 | A1 * | 2/2023 | Wu | G06N 3/0464 |

FOREIGN PATENT DOCUMENTS

| | | | | |
|---|---|---|---|---|
| WO | WO-2021207429 | A1 * | 10/2021 | ........ H04L 25/0246 |
| WO | WO-2021262943 | A1 * | 12/2021 | ...... B60W 60/00256 |

* cited by examiner

APPARATUS AND A METHOD FOR ESTIMATING DEPTH OF A SCENE

CROSS-REFERENCE TO RELATED APPLICATIONS

The present application claims the benefit of priority to U.S. Provisional Application No. 63/305,698, filed on Feb. 2, 2022, the contents of which are hereby incorporated by reference herein in their entirety.

TECHNICAL FIELD

The present disclosure generally relates to the field of depth imaging. More particularly, the present disclosure relates to an apparatus and a method for estimating depth of a scene.

BACKGROUND

Depth estimation is one of the key aspects of applications in the field of autonomous devices such as autonomous driving, robot navigation, robot vision, three-dimensional (3D) scene reconstruction, Augmented reality (AR), and the like. For instance, an autonomous mobile robot navigates and moves around spaces independently when performing tasks. The autonomous mobile robot acts without the need for guidance, finding paths and avoiding obstacles. To achieve this, the autonomous mobile robot uses depth estimation to analyze the environment and perform the tasks. Hence, depth estimation is a key prerequisite to perform multiple tasks such as perception, navigation, and planning.

Conventionally, depth cameras such as Time of Flight (ToF) cameras which estimates the depth based on the time for light reflected from objects to return to sensor are used. However, the ToF cameras have a limited Field of View (FoV). Further, a stereo vision-based depth camera which computes the depth based on a disparity between two views is used. The stereo vision-based depth cameras have a wide FoV. However, the stereo vision-based depth cameras have issues with pattern-less surfaces, specular reflections, repetitive patterns, and the like. For example, the pattern-less surfaces may include images with no features to correlate between the two views. In such cases, the depth estimation may be inaccurate. In an example, when there are specular reflections or repetitive patterns in the images, the two views may include drastic changes between each other or repetitions of features. The repetitive patterns in the image such as grids, fences, and the like, may result in regions of incorrect depth pixels, such as a nearer depth, an invalid depth, and the like. In such cases, the depth estimation may be inaccurate. Further, the depth cameras may interfere with other light sources. For example, the depth cameras used in the robot navigation may interfere with motion capture cameras used to benchmark robots. In such cases, the depth estimation may be inaccurate due to the interference. In addition, false depth images may cause systems to operate unexpectedly due to detection of ghost objects that appear closer than true objects.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure discloses an apparatus for estimating depth of a scene. The apparatus comprises a plurality of sensors, a memory, and one or more processors. The plurality of sensors comprises one or more Time of Flight (ToF) sensors and a plurality of pairs of stereo sensors. At least one pair of stereo sensors from the plurality of pairs of stereo sensors is placed perpendicular to other pairs of stereo sensors from the plurality of pairs of stereo sensors. The one or more processors are configured to determine a disparity for each of the plurality of sensors. The disparity is determined based on comparison between one or more features of each image from a plurality of images with other images from the plurality of images received from the plurality of pairs of stereo sensors, and evaluation of each image based on one or more pre-defined cost function parameters. Further, the disparity is determined based on depth information received from the one or more ToF sensors. The one or more processors are configured to determine a confidence value for each of the plurality of sensors, based on respective disparity, to generate a plurality of confidence values for the plurality of sensors. Thereafter, the one or more processors are configured to estimate a depth of the scene based on the disparity associated with a sensor from the plurality of sensors. The sensor is selected from the plurality of sensors based on the plurality of confidence values.

In an embodiment, the present disclosure discloses a method for estimating depth of a scene using an apparatus. The apparatus comprises a plurality of sensors comprising one or more Time of Flight (ToF) sensors and a plurality of pairs of stereo sensors. The method comprises determining a disparity for each of the plurality of sensors. The disparity is determined based on comparison between one or more features of each image from a plurality of images with other images from the plurality of images received from the plurality of pairs of stereo sensors, and evaluation of each image based on one or more pre-defined cost function parameters. Further, the disparity is determined based on depth information received from the one or more ToF sensors. The method comprises determining a confidence value for each of the plurality of sensors, based on respective disparity, to generate a plurality of confidence values for the plurality of sensors. Thereafter, the method comprises estimating a depth of the scene based on the disparity associated with a sensor from the plurality of sensors. The sensor is selected from the plurality of sensors based on the plurality of confidence values.

In an embodiment, the present disclosure discloses an autonomous device comprising an apparatus for estimating depth of a scene. The autonomous device may include, for instance, an autonomous robot, an autonomous vehicle, and the like. The apparatus comprises a plurality of sensors, a memory, and one or more processors. The plurality of sensors comprises one or more Time of Flight (ToF) sensors and a plurality of pairs of stereo sensors. At least one pair of stereo sensors from the plurality of pairs of stereo sensors is placed perpendicular to other pairs of stereo sensors from the plurality of pairs of stereo sensors. The one or more processors are configured to determine a disparity for each of the plurality of sensors. The disparity is determined based on comparison between one or more features of each image from a plurality of images with other images from the plurality of images received from the plurality of stereo sensor pairs, and evaluation of each image based on one or more pre-defined cost function parameters. Further, the disparity is determined based on depth information received from the one or more ToF sensors. The one or more processors are configured to determine a confidence value for each of the plurality of sensors, based on respective disparity, to generate a plurality of confidence values for the plurality of sensors. Thereafter, the one or more processors are configured to estimate a depth of the scene based on the disparity associated with a sensor from the plurality of sensors. The sensor is selected from the plurality of sensors based on the plurality of confidence values.

In an embodiment, the present disclosure discloses a non-transitory computer readable medium including instructions stored thereon that when processed by one or more processors cause an apparatus to estimate depth of a scene. The apparatus comprises a plurality of sensors, a memory, and one or more processors. The plurality of sensors comprises one or more Time of Flight (ToF) sensors and a plurality of pairs of stereo sensors. At least one pair of stereo sensors from the plurality of pairs of stereo sensors is placed perpendicular to other pairs of stereo sensors from the plurality of pairs of stereo sensors. The one or more processors are configured to determine a disparity for each of the plurality of sensors. The disparity is determined based on comparison between one or more features of each image from a plurality of images with other images from the plurality of images received from the plurality of pairs of stereo sensors, and evaluation of each image based on one or more pre-defined cost function parameters. Further, the disparity is determined based on depth information received from the one or more ToF sensors. The one or more processors are configured to determine a confidence value for each of the plurality of sensors, based on respective disparity, to generate a plurality of confidence values for the plurality of sensors. Thereafter, the one or more processors are configured to estimate a depth of the scene based on the disparity associated with a sensor from the plurality of sensors. The sensor is selected from the plurality of sensors based on the plurality of confidence values.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristics of the disclosure are set forth in the appended claims. The disclosure itself, however, as well as a preferred mode of use, further objectives, and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

It should be appreciated by those skilled in the art that any block diagram herein represents conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Depth estimation is used in diverse applications such as autonomous driving, robot navigation, robot vision, three-dimensional (3D) scene reconstruction, Augmented reality (AR), and the like. The present disclosure solves technical problem of limited Field of View (FoV) and issues such as pattern-less surfaces, specular reflections, repetitive patterns, and the like in the depth cameras.

The present disclosure provides an apparatus for estimating depth of a scene. The apparatus comprises multiple sensors. The multiple sensors include a combination of ToF sensors and stereo sensor pairs. The apparatus includes multiple baselines of different lengths. The apparatus includes horizontal and vertical baselines with varying lengths. The apparatus includes multiple pairs of stereo sensors, arranged perpendicularly with respect to each other. Using the multiple baselines, the present disclosure can accurately estimate the depth for the repetitive patterns. In addition, the present disclosure uses multiple sensors with different length baselines. This increases robust range of depth computation. For example, range depends on baseline, so, a small baseline may have closer range. Therefore, multiple sensors with different baselines are associated with different disparities. Thus, a repetitive pattern may not be disruptive for all baselines, thereby reducing the issues associated with the repetitive patterns. Further, the present disclosure uses the multiple pairs of stereo sensors which eliminates issues with specular reflections. Since different sensors are associated with different disparities, specular reflections can be detected. The present disclosure determines a confidence value for each of the multiple sensors, based on respective disparities. A sensor with high confidence is used in estimating the depth, thus increasing accuracy in case of the specular reflections. Further, a combination of the ToF sensors and stereo sensor pairs provides the advantages of both the ToF sensors and the stereo sensor pairs. Embodiments of the present disclosure provides a method for detecting potential erroneous sensor readings, adverse pattern detections, and the like. The confidence value is determined based on the detection and the depth is estimated. This improves depth accuracy and robustness of the depth estimation in presence of external disturbance.

Figure 1:
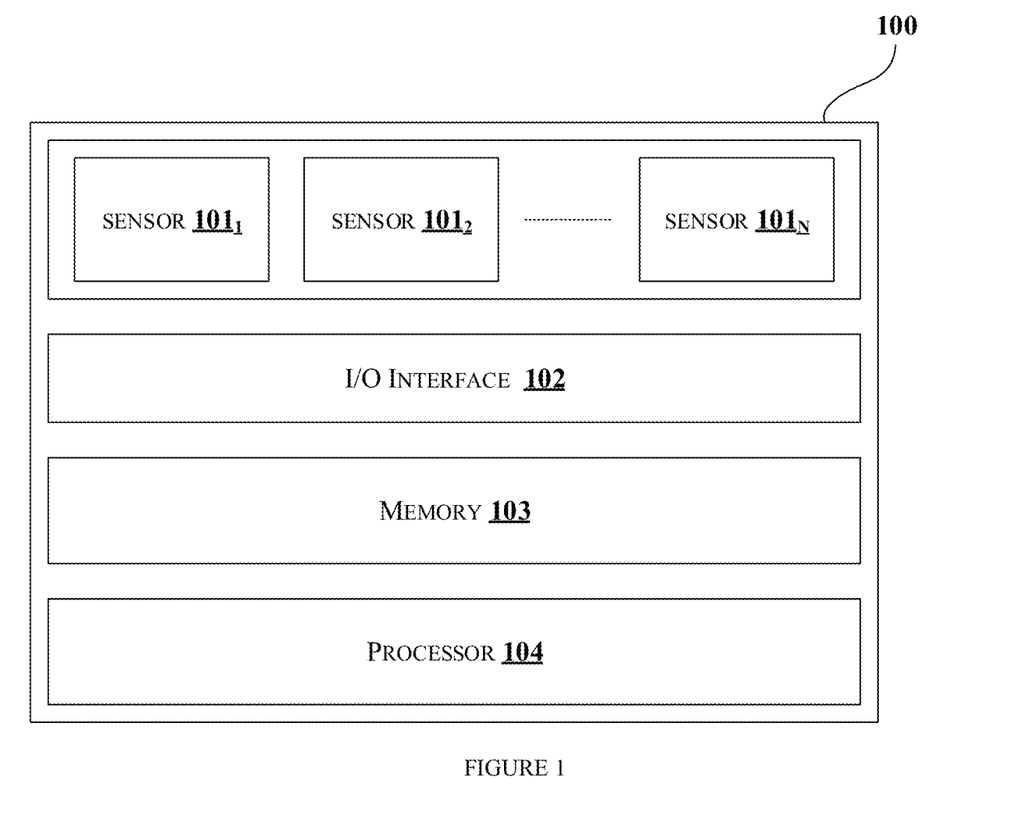
FIG. 1 illustrates an exemplary apparatus for estimating depth of a scene, in accordance with some embodiments of the present disclosure.

FIG. 1 illustrates an exemplary apparatus 100 for estimating depth of a scene, in accordance with some embodiments of the present disclosure. The exemplary apparatus 100 comprises sensors $101_1$, $101_2$, ..., $101_N$ (collectively referred as a plurality of sensors 101 hereafter in the present description), an Input/Output (I/O) interface 102, a memory 103, and a processor 104 (also referred as one or more processors 104). The plurality of sensors (101) may be sensors for measuring depth of the scene. The plurality of sensors 101 comprise one or more Time of Flight (ToF) sensors and a plurality of pairs of stereo sensors. A ToF sensor measures a distance by illuminating an object with a light source and measuring an amount of light reflected from the object. The ToF sensor may comprise an Infrared (IR) sensor and an IR projector. The IR sensor measures a time taken for the light to return to the IR sensor. The light is illuminated from the IR projector. Stereo imaging measures the distance based on a disparity of objects between stereo sensors.

Figure 2A:
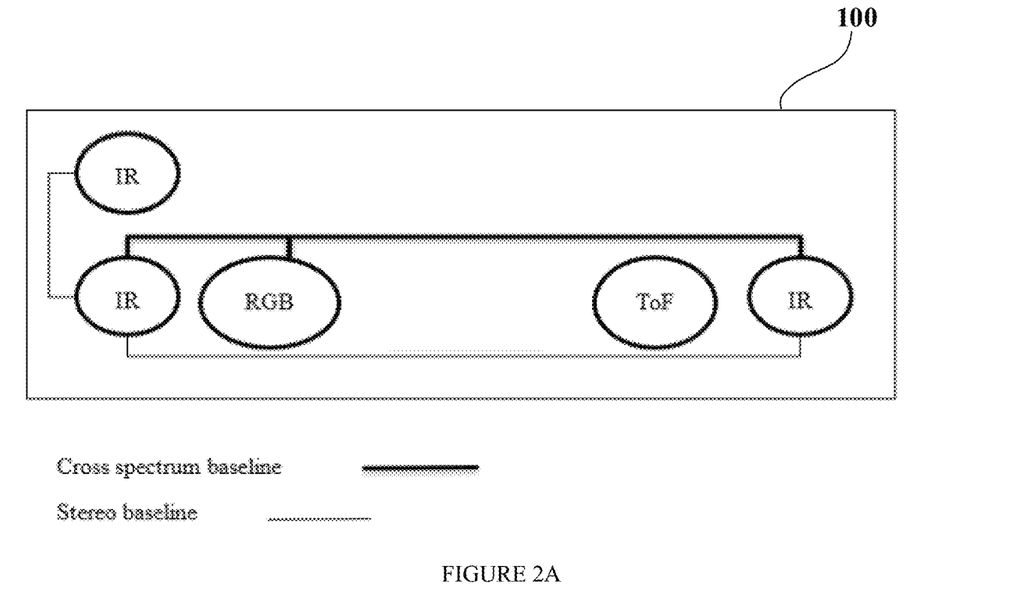
FIGS. 2A and 2B show exemplary illustrations of the apparatus, in accordance with some embodiments of the present disclosure.
Figure 2B:
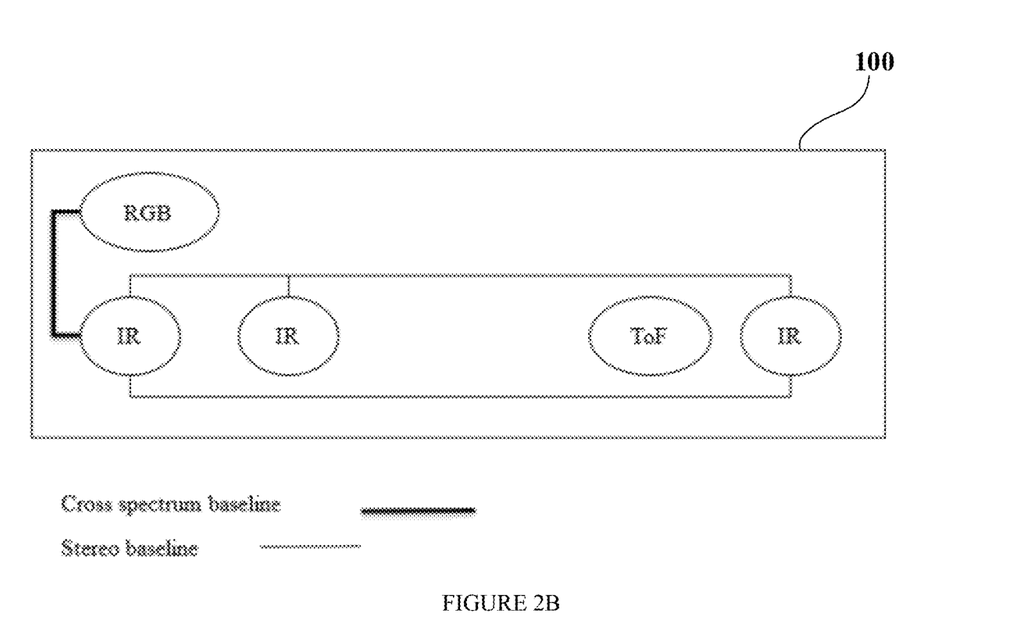

In the plurality of sensors 101, at least one pair of stereo sensors is placed vertical with respect to other pairs of stereo sensors from the plurality of pairs of stereo sensors. FIGS. 2A and 2B show exemplary illustrations of the apparatus 100. FIG. 2A illustrates the exemplary apparatus 100 with the plurality of sensors 101. In this example, two IR sensors from the plurality of sensors 101 form a pair of stereo sensors in vertical direction. Further, one RGB sensor and one IR sensor from the plurality of sensors 101 form other pair of stereo sensors in horizontal direction. The configuration of the plurality of sensors 101 provides accurate depth estimation. For instance, the accuracy of the depth estimation depends on a distance of an object from the plurality of sensors 101, that is, degree of color and uniformity of colors in images received from the plurality of sensors 101. In this example, three different baselines having different lengths facilitates three different ways to determine the distance to the object from the plurality of sensors 101. In case of three repetitive patterns, a false value between disparities is reduced by using three different ways of determining the distance. Pixels of the images from the plurality of sensors 101 may be similar, but may include different frequencies of repetitive patterns, and hence increases robustness of the depth estimation. FIG. 2A illustrates two different baselines, namely, cross spectrum baseline (represented by thick line) and stereo baseline (represented by thin line) used for estimating the depth. The cross-spectrum baseline refers to a baseline connecting two different types of sensors, for instance, a RGB sensor and an IR sensor. The stereo baseline refers to a baseline connecting same type of sensors, for instance, two IR sensors. Similarly, FIG. 2B illustrates the apparatus 100 with at least one pair of stereo sensors placed vertically with other pair of stereo sensors.

In one embodiment, a lens used in the apparatus 100 may be a wide FoV. In an example, the baselines for the plurality of sensors 101 may include a width of greater than or equal to 15 cm for a working range of 2 meters-5 meters and 5 cm for a working range of 5 cm-3 meters. In an embodiment, the apparatus 100 may include a global shutter preferably as a rolling shutter leads to artifacts under vibration. The apparatus 100 may facilitate good low light performance allowing shorter exposure times and reducing motion blur. In one embodiment, the apparatus 100 may include one or more hardware components. The one or more hardware components may include, but are not limited to, hardware synchronization tools, namely, programmable LEDs for communicating status, components for active depth with the one or more ToF sensors and the plurality of pairs of stereo sensors integration, and the like. The apparatus 100 may further include one or more software components.

Referring again to FIG. 1, the one or more processors 104 of the apparatus 100 may be configured to determine a disparity for each of the plurality of sensors 101. The one or more processors 104 may receive a plurality of images from the plurality of pairs of stereo sensors. The one or more processors 104 may determine the disparity based on a comparison between one or more features of each image from the plurality of images with other images from the plurality of images. Further, the one or more processors 104 may determine the disparity based on evaluation of each image based on one or more pre-defined cost function parameters. The one or more pre-defined cost function parameters may comprise at least one of, one or more artifacts, one or more patterns, and one or more errors associated with the plurality of images. Further, the one or more processors 104 may determine the disparity based on depth information received from the one or more ToF sensors. Then, the one or more processors 104 may determine a confidence value for each of the plurality of sensors 101, based on respective disparity. A plurality of confidence values may be generated for the plurality of sensors 101. Finally, the one or more processors 104 may estimate the depth of the scene based on the disparity associated with a sensor from the plurality of sensors 101, based on the plurality of confidence values.

The apparatus 100 may include the I/O interface 102, the memory 103, and Central Processing Units 104 (also referred as "CPUs" or "the one or more processors 104"). In some embodiments, the memory 103 may be communicatively coupled to the one or more processors 104. The memory 103 stores instructions executable by the one or more processors 104. The one or more processors 104 may comprise at least one data processor for executing program components for executing user or system-generated requests. The memory 103 may be communicatively coupled to the one or more processors 104. The memory 103 stores instructions, executable by the one or more processors 104, which, on execution, may cause the one or more processors 104 to estimate the depth of the scene. The I/O interface 102 is coupled with the one or more processors 104 through which an input signal or/and an output signal is communicated. For example, the one or more processors 104 may communicate with the plurality of sensors 101 via the I/O interface 102. In an embodiment, the apparatus 100 may be implemented in a variety of computing systems, such as a laptop computer, a desktop computer, a Personal Computer (PC), a notebook, a smartphone, a tablet, a server, a network server, a cloud-based server, and the like.

Figure 3:
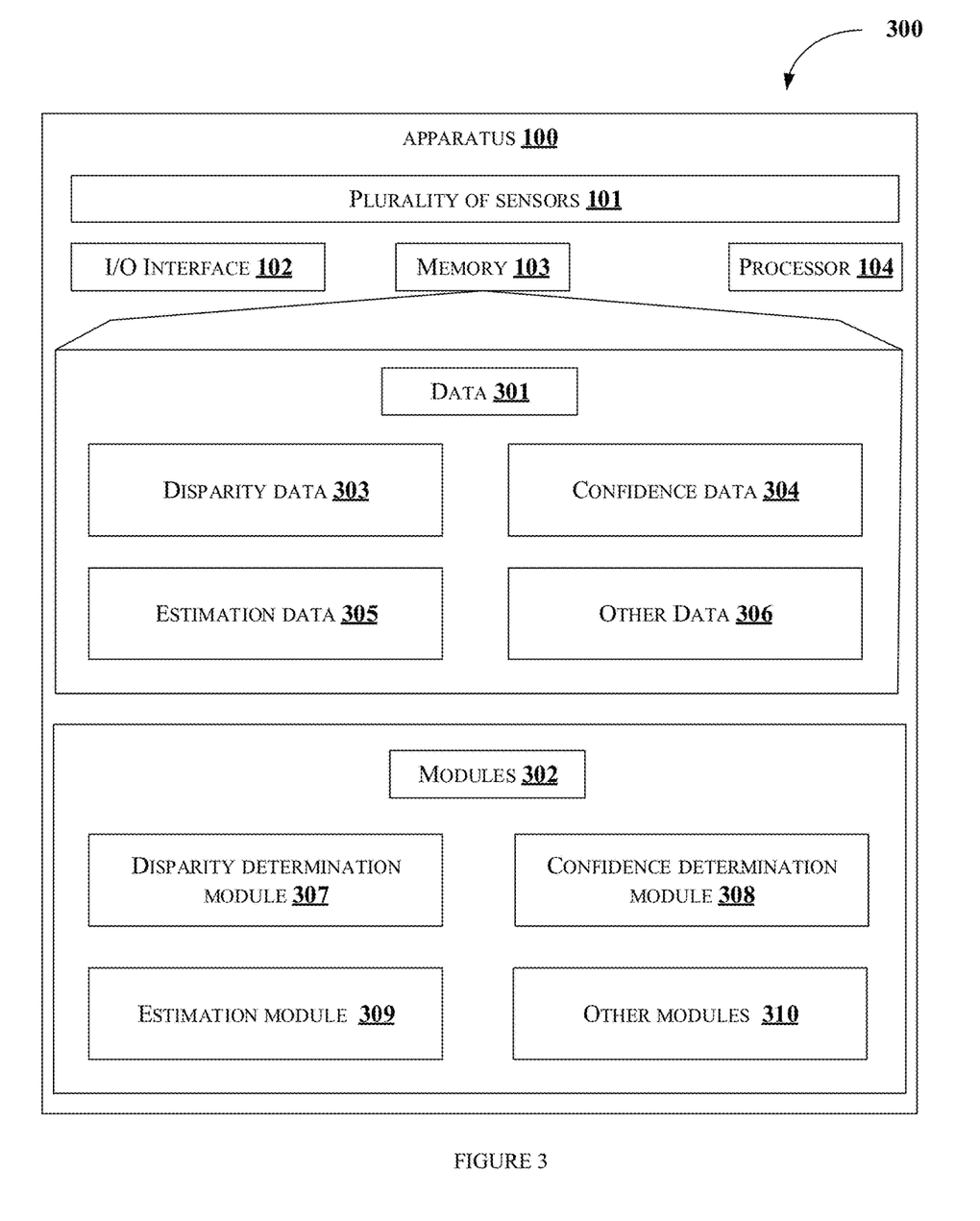
FIG. 3 illustrates a detailed diagram of the apparatus for estimating the depth of the scene, in accordance with some embodiments of the present disclosure.

FIG. 3 illustrates a detailed diagram 300 of the apparatus 100 for estimating the depth of the scene, in accordance with some embodiments of the present disclosure. In an embodiment, the memory 103 may include one or more modules 302 and data 301. The one or more modules 302 may be configured to perform the steps of the present disclosure using the data 301, to estimate the depth of the scene. In an embodiment, each of the one or more modules 302 may be a hardware unit which may be outside the memory 103 and coupled with the apparatus 100. As used herein, the term modules 302 refers to an Application Specific Integrated Circuit (ASIC), an electronic circuit, a Field-Programmable Gate Arrays (FPGA), Programmable System-on-Chip (PSoC), a combinational logic circuit, and/or other suitable components that provide described functionality. The one or more modules 302 when configured with the described functionality defined in the present disclosure will result in a novel hardware.

In one implementation, the modules 302 may include, for example, a disparity determination module 307, a confidence determination module 308, an estimation module 309, and other modules 310. It will be appreciated that such aforementioned modules 302 may be represented as a single module or a combination of different modules. In one implementation, the data 301 may include, for example, disparity data 303, confidence data 304, estimation data 305, and other data 306.

In an embodiment, the disparity determination module 307 may be configured to determine a disparity for each of the plurality of sensors 101. Firstly, the disparity determination module 307 may be configured to receive the plurality of images from the plurality of pairs of stereo sensors. Each of the plurality of images may comprise at least one of, an original image and one or more transformations of the original image. For example, the original image may be an image of a scene. The one or more transformations of the original image may comprise scaling, census transformation, 90-degree rotation, normalization, and the like. In an example, a Scale-Invariant Feature Transform (SIFT) may be used to transform the original image for generating the one or more transformations. A person skilled in the art will appreciate that any known transformation techniques other than the above-mentioned transformation technique may be used to generate the one or more transformations. The disparity determination module 307 may compare between one or more features of each image from the plurality of images with other images from the plurality of images. The disparity determination module 307 may identify one or more pixels of the image and the other images based on the comparison. Further, the disparity determination module 307 may determine a distance between the one or more pixels of the image and the other images. Then, the disparity determination module 307 may determine the disparity between the one or more features of each image and the other images, based on the distance. In an embodiment, a block of size N×N may be selected from a first image from the plurality of images. The block of size N×N from the first image is matched for common key points with a second image from the plurality of images. In one variation, the plurality of images of same object may have a slight displacement. A three-dimensional (3D) model of the object may be reconstructed based on the matched common key points with the first image and the second image. The common key points may be matched by identifying similar points based on the one or more features in the first image and the second image. In another embodiment, for the block of size N×N from the first image, a certain percentage of common key points of all blocks from the second image may be matched along an epipolar line. In an example, the matching may be performed using a matching cost function. For example, a block from the second image with a minimum cost may be matched with the block from the first image. The relative difference in pixels along the epipolar line on both images may be used to determine the disparity. A person skilled in the art will appreciate that any methods other than the above-mentioned methods may be used to determine the disparity based on comparison of the features in the plurality of images.

Further, the disparity determination module 307 may be further configured to determine the disparity based on evaluation of each image based on one or more pre-defined cost function parameters. The one or more pre-defined cost function parameters may comprise at least one of, one or more artifacts, one or more patterns, and one or more errors associated with the plurality of images. The disparity determination module 307 may detect a presence of at least one of, one or more artifacts, one or more patterns, and one or more errors associated with the plurality of images based on at least one of, one or more pre-defined values, evaluation using a machine learning model, and evaluation using one or more image processing techniques.

In an embodiment, the disparity determination module 307 may detect the one or more errors associated with the plurality of images. In an embodiment, the disparity determination module 307 may estimate statistical error bounds. A statistical error increases with depth. In one variation, the statistical bounds may be estimated using, for example, a gaussian function with mean=0 and sigma=function of disparity. The statistical error is to check whether two sensors are agreeing or not. The computation of the statistical bounds is dependent on setting a sigma threshold and with an assumption that the error is normal distribution with zero mean. The total error is a combination of a calibration error, a quantization error, and a matching error. In an embodiment, the calibration error may be estimated using a depth equation as L=fb/d. The depth 'L' is computed with an error having constant rate with a ground truth depth. 'f' is a focal length, 'b' is a baseline length which refers to a distance between two sensors, and 'd' is the distance. In one variation, error caused from the calibration error may be assumed to be 1% of the distance of a pixel in an image. In an embodiment, the quantization error is calculated as a difference between two neighbouring possible depth. The quantization error at a certain depth 'd' is given as:

$$\text{quantization error} = (fb/d) - (fb/(d+1)) = fb/d(d+1) \sim fb/d^2 \quad (1)$$

Without subpixel interpolation, by substituting L=fb/d, quantization step is approximated as $L^2/fb$. This shows that quantization error increases approximately quadratic to the depth 'L'. As an example, when b=0.1 m, f=570, L=5 m, the quantization error without subpixel is 0.43 m which can be 5 cm with 3 bit subpixel and 1.4 cm with 5 bit subpixel. In an embodiment, the matching error may be constant with the depth 'L'. In an example, a target object is assumed to be a patch of 10×10 cm whose distance is computed by taking mean depth of an area. The matching error is calculated as matching error=(standard deviation of the depth in the patch)/sqrt (number of the pixels in the patch).

In an embodiment, the disparity determination module 307 may detect the one or more errors based on evaluation using a machine learning model. In an embodiment, the disparity determination module 307 may use the machine learning model such as a convolutional neural network, a random forest classifier, and the like. The random forest classifier is a type of classification tree with high accuracy output. The random forest classifier generates decision trees that partition multiple features. Data containing the features is split into a training set and a test set. The training set may comprise a collection of pixels with respective disparities, feature vectors and correct/incorrect labels. A pixel is labelled as correct when the disparity is within a specified tolerance from a ground truth, otherwise the pixel is labelled as incorrect. During formation of training data, a new training set is created for each tree by bootstrapping from original training set. Each node performs randomly generated tests on random subsets of a full attribute set. Based on the attribute and a predefined threshold value, each of input samples is separated and divided as node's child and the node's child are subdivided recursively. Once the data is trained, the pixels of the test set with the respective disparities and feature vectors are presented to each trained tree. This process continues until a terminal node is reached and a decision is made on current pixel's class label. The predictions of all trees for a pixel are averaged and an average score is provided for the pixel, which is used to determine the disparity. A person skilled in the art will appreciate that any methods other than the above-mentioned methods may be used to determine the disparity based on detection of the one or more errors.

In an embodiment, the disparity determination module 307 may detect the one or more patterns in the plurality of images. The one or more patterns may comprise adverse patterns that affect estimation of the depth. For example, the disparity determination module 307 may identify a high-frequency-pattern along a stereo-axis in an image received from a sensor. In such scenario, the disparity determination module 307 may decrease a confidence value associated with the sensor. The one or more image processing techniques may be used to detect the high-frequency pattern. In another example, the confidence value of a sensor may be decreased based on the one or more pre-defined values such as pre-defined texture value. In another embodiment, the plurality of confidence values may be determined based on detection of the one or more artifacts in the plurality of images. For example, the plurality of confidence values may be decreased based on a specular object detection or occlusion detection. In an example, a classifier known in the art may be used for the specular object detection. For example, a positive and negative test set of an object is defined. The positive test set consists of X number of images where a specular object is present. The negative test set consists of Y number of images without any specular object. For each image a score is defined. Given the score of a positive or negative image, the image may be classified as including a specular or a non-specular object.

In an embodiment, the disparity determination module 307 may determine the disparity based on the depth information received from the one or more ToF sensors. The ToF sensors compute the depth information directly based on the time of light reflected from the objects to return to the ToF sensors. The disparity may be determined from the depth information based on a relation given by:

$$\text{disparity} = \text{constant factor}/\text{depth} \quad (2)$$

Constant factor is product of the focal length and the baseline between the two cameras in case of the plurality of stereo sensor pairs. In case of the one or more ToF sensors, the focal length of the one or more ToF sensors is known, and common baseline is used as required value to convert the depth information to the disparity. In an embodiment, the disparity determination module 307 may refine the disparity by interpolating one or more pixels in each image and the other images. The disparity determination module 307 may refine the disparity by estimating subpixel position. In one variation, the sub pixel estimation may be achieved by interpolation, integration, Taylor series approximation, phase correlation, and the like. The determined disparities associated with the plurality of sensors 101 may be stored as the disparity data 303 in the memory 103.

In an embodiment, the confidence determination module 308 may be configured to receive the disparity data 303 from the disparity determination module 307. Further, the confidence determination module 308 may determine a confidence value for each of the plurality of sensors 101, based on respective disparity. A plurality of confidence values may be generated for the plurality of sensors 101. In an embodiment, the plurality of confidence values may be initially provided for the plurality of sensors 101. Further, the plurality of confidence values may be updated based on the disparity. For example, the disparity may be decreased based on an error associated with an image from a sensor. A confidence value associated with the sensor may be decreased accordingly. The present disclosure provides a confidence value to each sensor from the plurality of sensors 101. The present disclosure provides a vote-based consensus to select the best depth among possible candidates. The plurality of confidence value may be stored as the confidence data 304 in the memory 103.

In an embodiment, the estimation module 309 may be configured to receive the disparity data 303 from the disparity determination module 307 and the confidence data 304 from the confidence determination module 308. Further, the estimation module 309 may be configured to estimate a depth of the scene based on the disparity associated with a sensor from the plurality of sensors 101. The sensor is selected from the plurality of sensors 101 based on the plurality of confidence values. Firstly, the estimation module 309 may filter one or more confidence values from the plurality of confidence values associated with the plurality of sensors 101, based on a pre-determined minimum threshold value. The pre-determined minimum threshold value may be based on a texture threshold, sigma bounds such values outside ⅔ sigma bounds, outlier detection algorithm, and the like. Further, the estimation module 309 may compare each confidence value with other confidence values from the one or more confidence values. Then, the estimation module 309 may select the sensor associated with a confidence value greater than the other confidence values from the one or more confidence values.

The other data 306 may store data, including temporary data and temporary files, generated by the one or more modules 302 for performing the various functions of the apparatus 100. The other data 306 may be stored in the memory 103. The one or more modules 302 may also include the other modules 310 to perform various miscellaneous functionalities of the apparatus 100. It will be appreciated that the one or more modules 302 may be represented as a single module or a combination of different modules.

Figure 4:
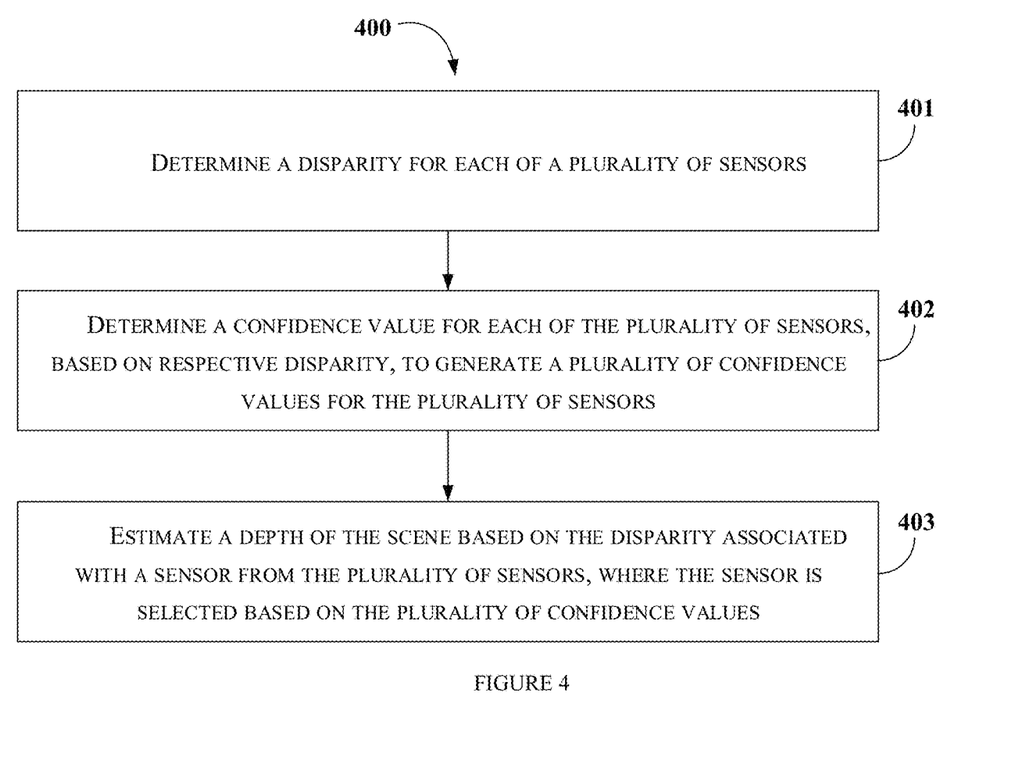
FIG. 4 shows an exemplary flow chart illustrating method steps for estimating the depth of the scene, in accordance with some embodiments of the present disclosure.

FIG. 4 shows an exemplary flow chart illustrating method steps for estimating the depth of the scene, in accordance with some embodiments of the present disclosure. As illustrated in FIG. 4, the method 400 may comprise one or more steps. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At step 401, the apparatus 100 may determine a disparity for each of the plurality of sensors 101. The apparatus 100 may compare between one or more features of each image from the plurality of images with other images from the plurality of images received from the plurality of pairs of stereo sensors. Further, the apparatus 100 may determine the disparity based on evaluation of each image based on one or more pre-defined cost function parameters. The apparatus 100 may determine the disparity based on the depth information received from the one or more ToF sensors.

At step 402, the apparatus 100 may determine a confidence value for each of the plurality of sensors 101, based on respective disparity. The plurality of confidence values may be generated for the plurality of sensors 101.

At step 403, the apparatus 100 may estimate the depth of the scene based on the disparity associated with a sensor from the plurality of sensors 101. The sensor is selected from the plurality of sensors 101 based on the plurality of confidence values. The apparatus 100 may filter one or more confidence values from the plurality of confidence values associated with the plurality of sensors 101, based on a pre-determined minimum threshold value. Further, the apparatus 100 may compare each confidence value with other confidence values from the one or more confidence values to select the sensor.

Figure 5:
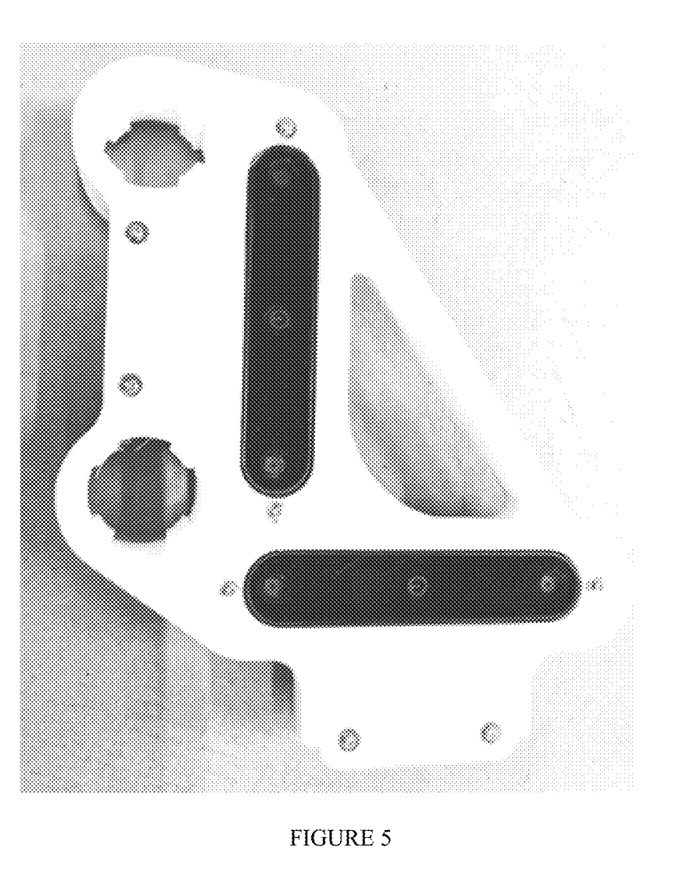
FIG. 5 illustrates an exemplary apparatus prototype, in accordance with some embodiments of the present disclosure.

FIG. 5 illustrates an exemplary apparatus prototype, in accordance with some embodiments of the present disclosure. A top view of the apparatus 100 is illustrated. The apparatus 100 including three sensors placed horizontally in combination with three sensors placed vertically is shown. The apparatus prototype is a sample depiction of the apparatus and is not limited by any specific combination or configuration.

Computer System

Figure 6:
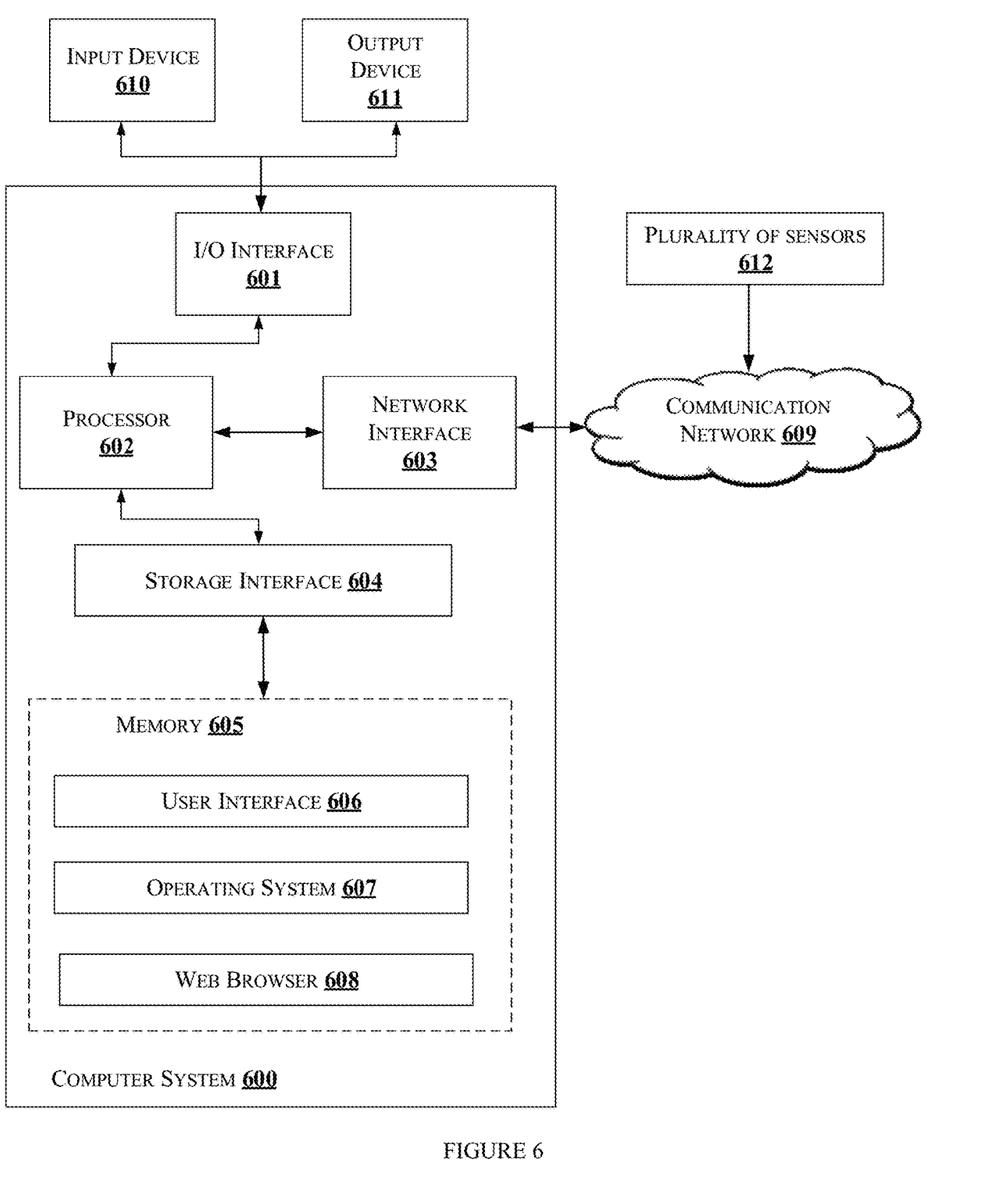
FIG. 6 shows a block diagram of a general-purpose computing system for estimating the depth of the scene, in accordance with embodiments of the present disclosure.

FIG. 6 illustrates a block diagram of an exemplary computer system 600 for implementing embodiments consistent with the present disclosure. In an embodiment, the computer system 600 may be a part of the apparatus 100. Thus, the computer system 600 may be used to estimate the depth of the scene. The computer system 600 may receive the plurality of images from the plurality of sensors 612 over a communication network 609. The computer system 600 may comprise a Central Processing Unit 602 (also referred as "CPU" or "processor"). The processor 602 may comprise at least one data processor. The processor 602 may include specialized processing units such as integrated system (bus) controllers, memory management control units, floating point units, graphics processing units, digital signal processing units, etc.

The processor 602 may be disposed in communication with one or more input/output (I/O) devices (not shown) via I/O interface 601. The I/O interface 601 may employ communication protocols/methods such as, without limitation, audio, analog, digital, monoaural, RCA, stereo, IEEE (Institute of Electrical and Electronics Engineers)-1394, serial bus, universal serial bus (USB), infrared, PS/2, BNC, coaxial, component, composite, digital visual interface (DVI), high-definition multimedia interface (HDMI), Radio Frequency (RF) antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 601, the computer system 600 may communicate with one or more I/O devices. For example, the input device 610 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 611 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

The processor 602 may be disposed in communication with the communication network 609 via a network interface 603. The network interface 603 may communicate with the communication network 609. The network interface 603 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 609 may include, without limitation, a direct interconnection, local area network (LAN), wide area network (WAN), wireless network (e.g., using Wireless Application Protocol), the Internet, etc. The network interface 603 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 609 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi, and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 602 may be disposed in communication with a memory 605 (e.g., RAM, ROM, etc. not shown in FIG. 6) via a storage interface 604. The storage interface 604 may connect to memory 605 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 605 may store a collection of program or database components, including, without limitation, user interface 606, an operating system 607, web browser 608 etc. In some embodiments, computer system 600 may store user/application data, such as, the data, variables, records, etc., as described in this disclosure. Such databases may be implemented as fault-tolerant, relational, scalable, secure databases such as Oracle® or Sybase®.

The operating system 607 may facilitate resource management and operation of the computer system 600. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

In some embodiments, the computer system 600 may implement the web browser 608 stored program component. The web browser 608 may be a hypertext viewing application, for example MICROSOFT® INTERNET EXPLORER™, GOOGLE® CHROME™, MOZILLA® FIREFOX™, APPLE™ SAFARI™, etc. Secure web browsing may be provided using Secure Hypertext Transport Protocol (HTTPS), Secure Sockets Layer (SSL), Transport Layer Security (TLS), etc. Web browsers 608 may utilize facilities such as AJAX™, DHTML™, ADOBE® FLASH™, JAVASCRIPT™, JAVA™, Application Programming Interfaces (APIs), etc. In some embodiments, the computer system 600 may implement a mail server (not shown in Figure) stored program component. The mail server may be an Internet mail server such as Microsoft Exchange, or the like. The mail server may utilize facilities such as ASP™, ACTIVEX™, ANSI™ C++/C#, MICROSOFT®, .NET™, CGI SCRIPTS™, JAVA™, JAVASCRIPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 600 may implement a mail client stored program component. The mail client (not shown in Figure) may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, Compact Disc Read-Only Memory (CD ROMs), Digital Video Disc (DVDs), flash drives, disks, and any other known physical storage media.

The present disclosure provides an apparatus that includes multiple baselines of different lengths. The apparatus includes horizontal and vertical baselines with varying lengths. This increases accuracy in estimation of the depth for the repetitive patterns. In addition, the present disclosure uses multiple sensors including a combination of ToF sensors and stereo sensor pairs. This provides maximum redundancy and increases robust range of depth computation. Further, usage of the multiple pairs of stereo sensors eliminates issues with specular reflections for reflective surfaces such as polished metal, painted surfaces, overhanging lights, and the like. Further, a combination of the ToF sensors and stereo sensor pairs provides the advantages of both the ToF sensors and the stereo sensor pairs. The present disclosure determines a confidence value for each of the multiple sensors, based on respective disparities. A sensor with high confidence is used in estimating the depth, thus increasing accuracy in the depth estimation. Embodiments of the present disclosure provides a method for detecting potential erroneous sensor readings, adverse pattern detections, and the like. This improves depth accuracy and robustness of the depth estimation in presence of external disturbance.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 shows certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. An apparatus for estimating depth of a scene, the apparatus comprises:
    a plurality of sensors comprising one or more Time of Flight (ToF) sensors and a plurality of pairs of stereo sensors, wherein at least one pair of stereo sensors from the plurality of pairs of stereo sensors is placed perpendicular to other pairs of stereo sensors from the plurality of pairs of stereo sensors;
    a memory for storing processor-executable instructions; and
    one or more processors configured to:
        determine a disparity for each of the plurality of sensors based on:
            comparison between one or more features of each image from a plurality of images with other images from the plurality of images received from the plurality of pairs of stereo sensors, and evaluation of each image based on one or more pre-defined cost function parameters; and
            depth information received from the one or more ToF sensors;
        determine a confidence value for each of the plurality of sensors, based on respective disparity, to generate a plurality of confidence values for the plurality of sensors; and
        estimate a depth of the scene based on the disparity associated with a sensor from the plurality of sensors, wherein the sensor is selected from the plurality of sensors based on the plurality of confidence values.

2. The apparatus of claim 1, wherein each of the plurality of images comprises at least one of, an original image and one or more transformations of the original image.

3. The apparatus of claim 1, wherein the one or more pre-defined cost function parameters comprise at least one of, one or more artifacts, one or more patterns, and one or more errors associated with the plurality of images.

4. The apparatus of claim 1, wherein determining the disparity for each of the plurality of sensors based on the evaluation of each image comprises:
    detecting a presence of at least one of, one or more artifacts, one or more patterns, and one or more errors associated with the plurality of images based on at least one of, one or more pre-defined values, evaluation using a machine learning model, and evaluation using one or more image processing techniques.

5. The apparatus of claim 1, wherein the one or more processors determine the disparity between the one or more features of each image and the other images by:
    identifying one or more pixels of the image and the other images based on the comparison;
    determining a distance between the one or more pixels of the image and the other images; and
    determining the disparity between the one or more features of each image and the other images, based on the distance.

6. The apparatus of claim 1, wherein the one or more processors further determine the disparity for each of the plurality of images received from the plurality of pairs of stereo sensors, by:
    refining the disparity by interpolating one or more pixels in each image and the other images.

7. The apparatus of claim 1, wherein the one or more processors select the sensor from the plurality of sensors based on the plurality of confidence values by:
    filtering one or more confidence values from the plurality of confidence values associated with the plurality of sensors, based on a pre-determined minimum threshold value;
    comparing each confidence value with other confidence values from the one or more confidence values; and
    selecting the sensor associated with a confidence value greater than the other confidence values from the one or more confidence values.

8. A method for estimating depth of a scene, using an apparatus comprising a plurality of sensors comprising one or more Time of Flight (ToF) sensors and a plurality of pairs of stereo sensors, the method comprising:
    determining a disparity for each of the plurality of sensors based on:
        comparison between one or more features of each image from a plurality of images with other images from the plurality of images received from the plurality of pairs of stereo sensors, and evaluation of each image based on one or more pre-defined cost function parameters; and
        depth information received from the one or more ToF sensors;
    determining a confidence value for each of the plurality of sensors, based on respective disparity, to generate a plurality of confidence values for the plurality of sensors; and
    estimating a depth of the scene based on the disparity associated with a sensor from the plurality of sensors, wherein the sensor is selected from the plurality of sensors based on the plurality of confidence values.

9. The method of claim 7, wherein each of the plurality of images comprises at least one of, an original image and one or more transformations of the original image.

10. The method of claim 7, wherein the one or more pre-defined cost function parameters comprise at least one of, one or more artifacts, one or more patterns, and one or more errors associated with the plurality of images.

11. The method of claim 7, wherein determining the disparity for each of the plurality of sensors based on the evaluation of the one or more pre-defined cost function parameters comprises:
    detecting a presence of at least one of, one or more artifacts, one or more patterns, and one or more errors associated with the plurality of images based on at least one of, one or more pre-defined values, evaluation using a machine learning model, and evaluation using one or more image processing techniques.

12. The method of claim 7, wherein determining the disparity between the one or more features of each image and the other images comprises:
    identifying one or more pixels of the image and the other images based on the comparison;
    determining a distance between the one or more pixels of the image and the other images; and
    determining the disparity between the one or more features of each image and the other images, based on the distance.

13. The method of claim 7, wherein determining the disparity for each of the plurality of images received from the plurality of pairs of stereo sensors, further comprises:

refining the disparity by interpolating one or more pixels in each image and the other images.

14. The method of claim 7, wherein selecting the sensor from the plurality of sensors based on the plurality of confidence values comprises:
filtering one or more confidence values from the plurality of confidence values associated with the plurality of sensors, based on a pre-determined minimum threshold value;
comparing each confidence value with other confidence values from the one or more confidence values; and
selecting the sensor associated with a confidence value greater than the other confidence values from the one or more confidence values.

15. An autonomous device, comprising the apparatus of claim 1 for estimating depth of a scene.

16. A non-transitory computer readable medium including instructions stored thereon that when processed by one or more processors, wherein the instructions cause an apparatus to:
determine a disparity for each of the plurality of sensors based on:
comparison between one or more features of each image from a plurality of images with other images from the plurality of images received from the plurality of pairs of stereo sensors, and evaluation of each image based on one or more pre-defined cost function parameters; and
depth information received from one or more Time of Flight (ToF) sensors;
determine a confidence value for each of the plurality of sensors, based on respective disparity, to generate a plurality of confidence values for the plurality of sensors; and
estimate a depth of the scene based on the disparity associated with a sensor from the plurality of sensors, wherein the sensor is selected from the plurality of sensors based on the plurality of confidence values.

17. The medium of claim 16, wherein the instructions cause the one or more processors to determine the disparity for each of the plurality of sensors based on the evaluation of the one or more pre-defined cost function parameters comprises:
detecting a presence of at least one of, one or more artifacts, one or more patterns, and one or more errors associated with the plurality of images based on at least one of, one or more pre-defined values, evaluation using a machine learning model, and evaluation using one or more image processing techniques.

18. The medium of claim 16, wherein the instructions cause the one or more processors to determine the disparity between the one or more features of each image and the other images comprises:
identifying one or more pixels of the image and the other images based on the comparison;
determining a distance between the one or more pixels of the image and the other images; and
determining the disparity between the one or more features of each image and the other images, based on the distance.

19. The medium of claim 16, wherein the instructions cause the one or more processors to determine the disparity for each of the plurality of images received from the plurality of pairs of stereo sensors, further comprises:
refining the disparity by interpolating one or more pixels in each image and the other images.

20. The medium of claim 16, wherein the instructions cause the one or more processors to select the sensor from the plurality of sensors based on the plurality of confidence values by:
filtering one or more confidence values from the plurality of confidence values associated with the plurality of sensors, based on a pre-determined minimum threshold value;
comparing each confidence value with other confidence values from the one or more confidence values; and
selecting the sensor associated with a confidence value greater than the other confidence values from the one or more confidence values.

* * * * *